United States Patent [19]

Adair

[11] Patent Number: 4,575,290

[45] Date of Patent: Mar. 11, 1986

[54] APPARATUS AND METHOD FOR PRODUCING TEMPLATES

[75] Inventor: William A. Adair, Des Plaines, Ill.

[73] Assignee: Teledyne Industries, Inc., Los Angeles, Calif.

[21] Appl. No.: 428,962

[22] Filed: Sep. 30, 1982

[51] Int. Cl.[4] .......................... B23C 9/00; B23B 47/00

[52] U.S. Cl. ................................ 409/132; 144/252 R; 408/67; 409/137

[58] Field of Search ............... 409/134, 137, 131, 132; 408/710, 67, 87, 60; 83/98-100, 31, 547, 925 CC; 144/252 R; 29/DIG. 94, DIG. 84, DIG. 86

[56] References Cited

U.S. PATENT DOCUMENTS

| | | | |
|---|---|---|---|
| 2,175,461 | 10/1935 | Gylleck et al. | 83/100 |
| 2,489,559 | 11/1949 | Boyle | 83/100 |
| 2,684,093 | 7/1954 | Enzmann et al. | 29/DIG. 84 |
| 2,774,131 | 12/1956 | Crane | 83/169 |
| 3,041,905 | 7/1962 | Gabriel | 83/100 |
| 3,494,232 | 2/1970 | Lindau | 83/100 |
| 3,598,006 | 8/1971 | Gerber | 83/925 CC X |
| 3,763,748 | 10/1973 | Gallagher | 83/100 X |
| 3,880,047 | 4/1975 | Dosier | 409/137 |
| 3,942,411 | 3/1976 | Gerber | 83/100 |
| 4,037,982 | 7/1977 | Clement | 408/110 X |
| 4,112,797 | 9/1978 | Pearl | 83/925 CC X |
| 4,269,549 | 5/1981 | Block | 408/87 |
| 4,312,254 | 4/1982 | Pearl | 83/925 CC X |

FOREIGN PATENT DOCUMENTS

| | | | |
|---|---|---|---|
| 189662 | 6/1937 | Switzerland | 83/100 |

OTHER PUBLICATIONS

*Vacuum Slug Removal Apparatus*, W. D. Beam and W. T. Cook, Western Electric Technical Digest, No. 58, Apr. 1980.

*Primary Examiner*—William R. Briggs

*Attorney, Agent, or Firm*—Lockwood, Alex, FitzGibbon & Cummings

[57] ABSTRACT

Apparatus for and method of making templates and the like wherein each stack of blank sheets is supported in raised position on a support platform and the space between the stack and the platform serves as a channel through which air is caused to flow in such volume and velocity as to remove the debris formed when template or similar openings are cut in the blank sheets by one or more cutting tools. Either the support platform or the cutting tool carrier or both may be controllably shiftable on the x and y axes, and either the support platform or cutting tool carrier or both may be vertically reciprocable on the z axis.

9 Claims, 5 Drawing Figures

APPARATUS AND METHOD FOR PRODUCING TEMPLATES

Figure 1:
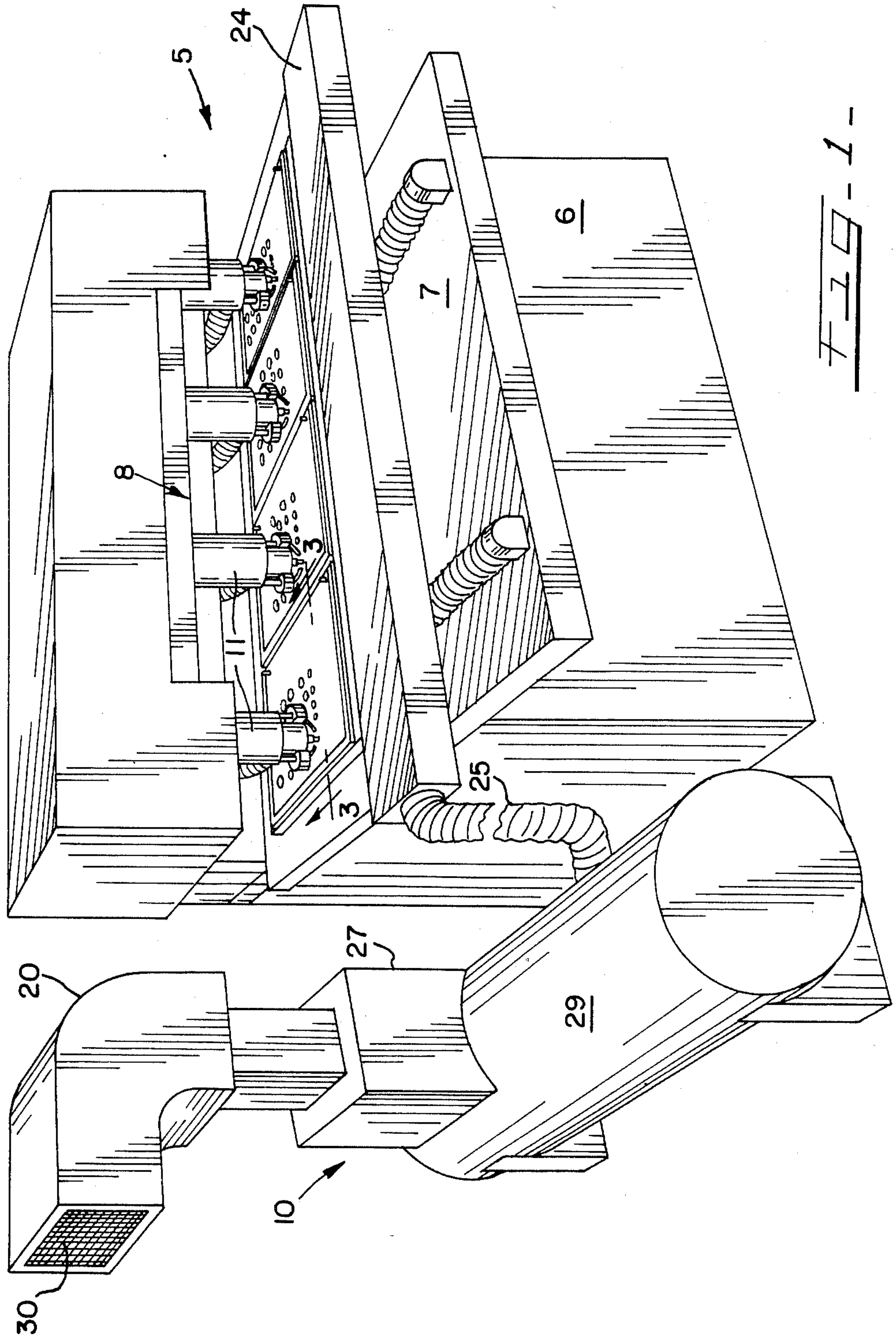

This invention relates, generally, to innovations and improvements in apparatus for, and method of, making workpieces, such as drafting templates, in the form of sheet material having openings formed therein, of predetermined size, shape and position. More particularly, the invention relates to such innovations and improvements which serve to remove the debris or waste (i.e. cutout pieces, chips, particles, dust, etc.) as formed to a collection site for disposal. By virtue of such immediate and continuous removal, the immediate and general areas of cutting operations are maintained free of debris; and, the performance and capacity of the apparatus are substantially improved and increased.

Apparatus and/or machines are currently available for the production of templates or similar workpieces from sheet material composed of plastic or other materials. For example, one such machine is shown and described in U.S. Pat. No. 3,880,047 dated Apr. 29, 1975, and available from Paul Dosier Associates, Inc., Costa Mesa, Calif. under the designation ROUTER/-PROFILER Machine Tool Model 0113-H15. In this commercially available machine there is a work support platform which is shiftable on the x and y axes and cutter-tool carrying head mounted above the table and vertically reciprocable on the z axis. The shifting of the support table or platform on the x and y axes is numerically controlled in accordance with a predetermined program for each particular template or similar product. Such apparatus or machines are commonly referred to as "NCR routers", i.e. numerically controlled routers.

In these known machines and methods of operating, the blanks from which the workpieces or templates are to be formed are supported on a platen resting on a shiftable platform. The debris that is formed and accumulates during the routing or cutting operation or work performed on the blanks must be removed from the various surfaces where it deposits. Various procedures have been used for removal of the debris including manually brushing the debris onto the floor. In the above-mentioned U.S. Pat. No. 3,880,047, a vacuum attachment is disclosed for removing dust and chips from the cutting site. However, such vacuum removal means is of relatively limited capacity since it is not suitable for removal of large cutout pieces as distinguished from small chips and granules or dust.

In the apparatus and method of the present invention, the stacks of blanks from which the templates or other workpieces are to be produced are supported in a raised or elevated position on and above the support platform and the space therebetween is utilized as a plenum chamber or channel in which air is caused to flow in sufficient volume and velocity as to create a suction in the openings formed in the stack of blanks and carry off in the air stream the resulting debris to a collection site for disposition. The system of the present invention is such that it is capable of removing not only chips, dust and similar forms of debris produced during the cutting or routing operation but also relatively large cutout pieces. The natural tendency of such debris to drop or fall under the influence of gravity facilitates its removal in the apparatus and method of this invention. The volume and velocity of the air stream utilized for removing the debris can be readily adjusted as required in accordance with the quantity and character of the debris being generated.

The object of the present invention, generally stated, is the provision of improved apparatus for and method of removal of debris created or produced during the production of templates or similar workpieces having openings of predetermined size, shape and location from stacks of blanks, whereby the debris is removed efficiently and economically so that the apparatus is operated and maintained in a debris-free condition which is conducive to increased production and efficiency.

An important object of the invention is to maintain a stack of blanks from which templates or similar workpieces are being produced in a raised or elevated position with respect to a support platform or table and utilize the available space intermediate the stack of blanks and the support platform or table as a plenum chamber or channel through which air can be caused to flow at such velocity and in such volume as to suck down the debris as it is formed in the openings and carry the debris away to a disposition and collection site.

A further and important object of the invention is the provision of a machine and method of the character referred to in the preceding objects in which means is provided to direct one or more jets of air into the openings being formed in the blanks by the cutter tools or routers so as to assist in the removal of debris.

A further object of the invention is the provision of apparatus and method conforming to and embodying the present invention in which the cutter or routing tools are enclosed within circular brushes with the bristle ends engaging the uppermost blank in each stack so as to hold the stack down and form a chamber around the cutter tool or router and from which air supplied under pressure escapes downwardly through the openings being formed in the blanks so as to assist in the downward escape and removal of the debris formed by the tools.

Figure 2:
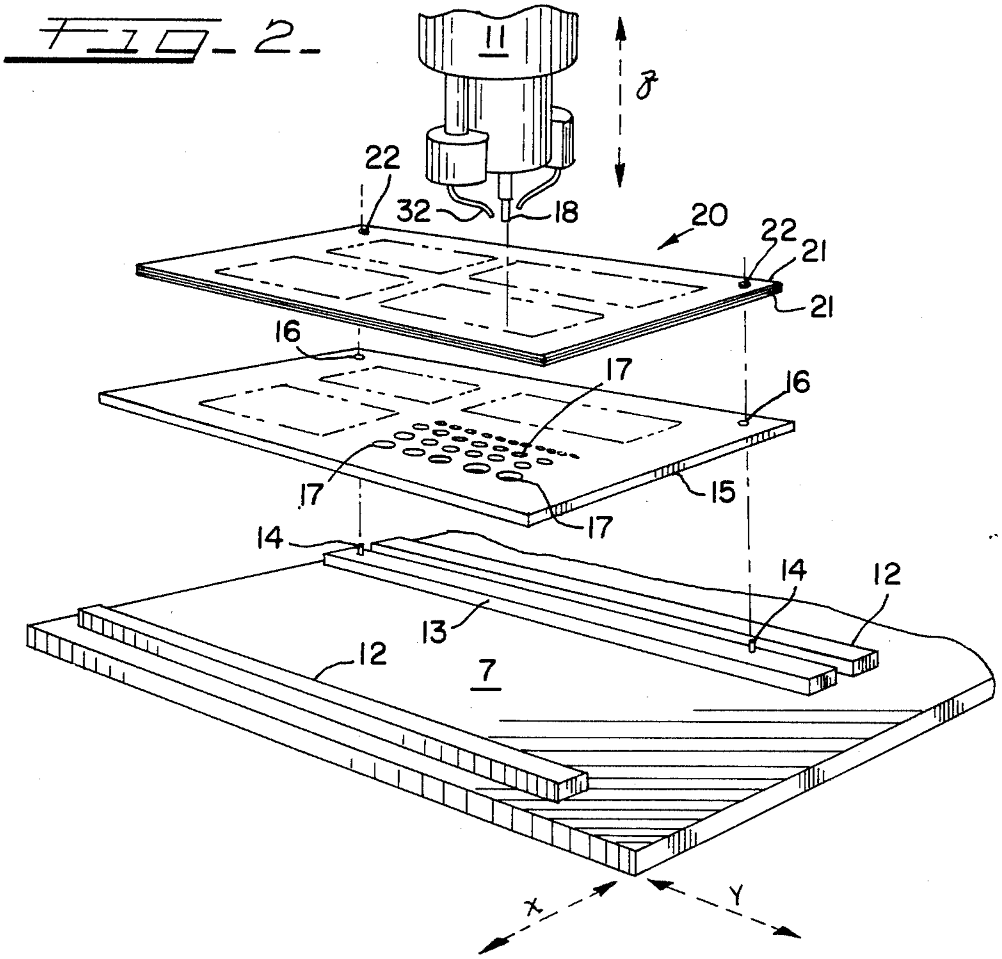
Figure 3:
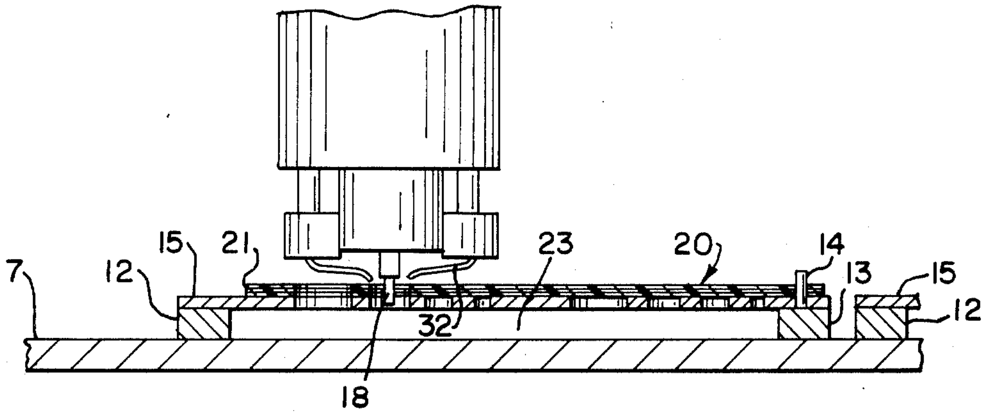
Figure 4:
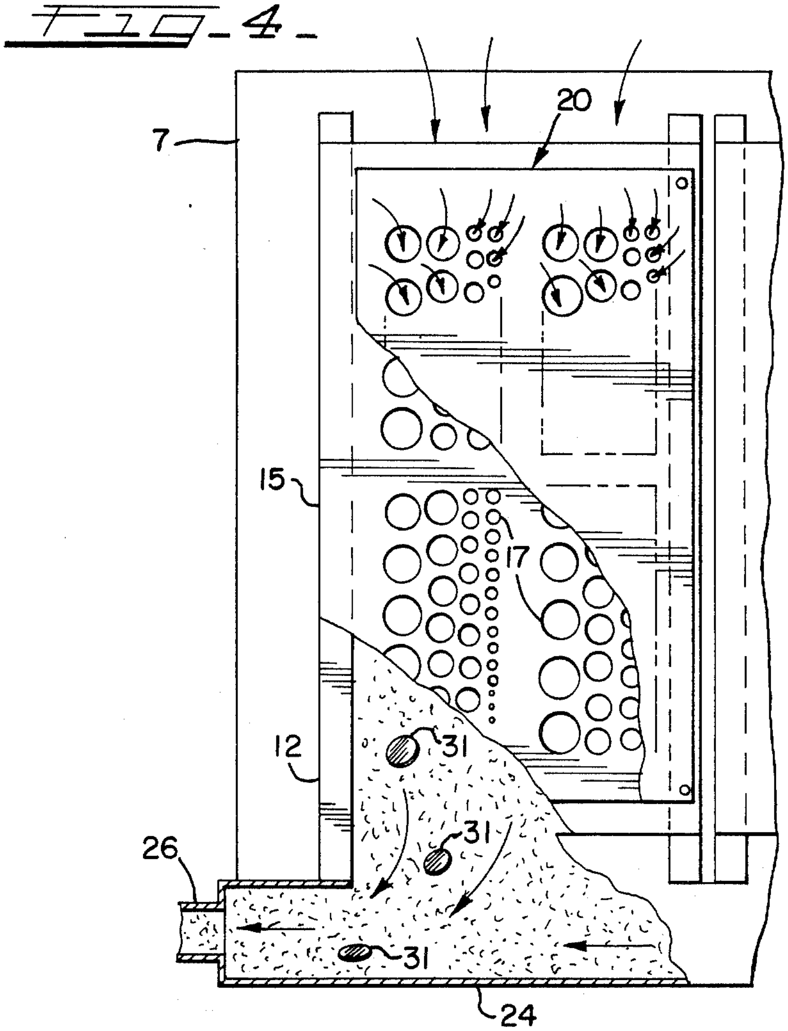
Figure 5:
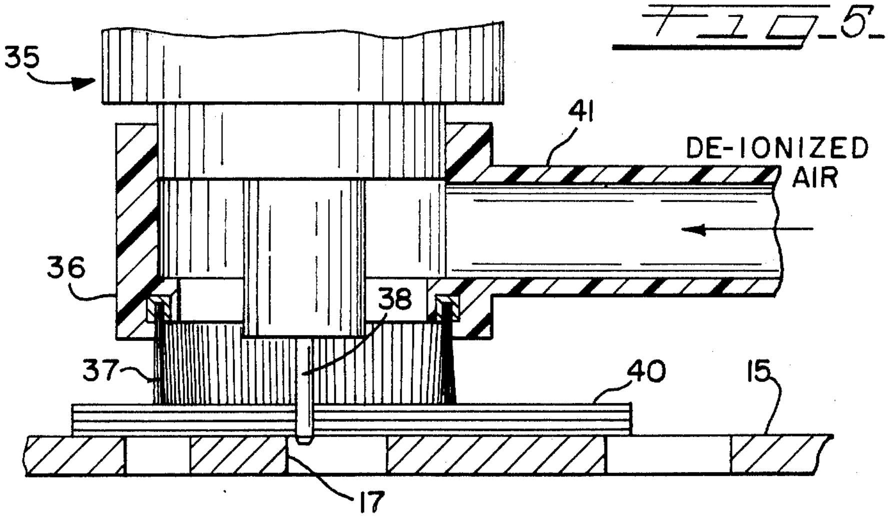

For a more complete understanding of the nature and scope of the present invention, reference may now be had to the following detailed description of preferred embodiments thereof taken in connection with the accompanying drawings wherein:

FIG. 1 is a perspective view of a machine or apparatus incorporating one embodiment of the present invention and in which the method of the invention may be practiced;

FIG. 2 is an exploded detail view based on the apparatus of FIG. 1 and illustrating the relationship between the laterally shiftable support platform or table thereof, a platen provided with openings to accommodate the lower ends of the routers or cutting tools which penetrates the stacks of blanks, one stack of blanks from which templates or similar workpieces are to be formed, and a vertically, reciprocable router or cutting tool;

FIG. 3 is a detail view on enlarged scale taken on lines 3—3 of FIG. 1 with a router or other cutting tool in its normal working relationship;

FIG. 4 is a fragmentary top plan view on enlarged scale of one of the work stations of the machine of FIG. 1 and illustrating work in progress; and FIG. 5 is a detail elevational view, partly in vertical section, showing an alternate auxiliary means for supplying air under pressure to the upper surface of a stack of blanks in an area surrounding the routing or cutting tool so as to assist in the removal of the debris being generated.

The machine or apparatus indicated generally at 5 in FIG. 1 includes a machine base 6, a support platform or table 7 which is controllably shiftable on the x and y axes, a vertically reciprocable tool carrier or head 8 and an air circulating and debris removal system indicated generally at 10. Machine 5 in respect to the base 6, shiftable table or platform 7 and vertically reciprocable tool carrier or head 8 correspond generally to known and commercially available template making machines such as the one disclosed in the above-mentioned U.S. Pat. No. 3,880,047 and available from Paul Dosier Associates, Inc., Costa Mesa, Calif. as Model No. 0113-H15. Such a machine may be provided with known control means so that it can be programmed to operate automatically in respect to shifting the table or support platform 7 on the x and y axes whereby the cutting tools or routers carried by the head 8 function to form or cut openings of predetermined size, shape and location in stacks of blanks which are supported or carried by the table 7 in the particular manner of the present invention. Such control means being known and available commercially, do not constitute a part of the present invention and a description or showing thereof is not required in order for those skilled in the art to have a complete and full understanding of the present invention. Manual shifting could also be used.

Referring to FIG. 2, the platform or table 7 is indicated to be shiftable on the x and y axes while a rotary cutter tool or router indicated generally at 11 is indicated as vertically reciprocable on the z axis. A plurality of parallel pairs of spacer strips 12–13 are secured on the top surface of the platform 7 with at least one strip in each pair (strip 13 in FIG. 2) being provided with two or more upwardly projecting, locating pins 14—14. It will be understood that, if desired, additional locating pins 14 can also be provided on the support strip 13 and the support strips 12 may also be provided with locating pins. However, it has been found that one pair of locator pins 14 on one of the support strips 12 or 13 is normally sufficient.

A platen 15 is supported on each set or pair of support strips 12 and 13. Each platen 15 is provided with two or more of pin-receiving holes 16—16 located as to fit over the locating pins 14. In addition, each of the platens 15 is provided with a plurality of openings 17—17 of such size, shape and location as to accommodate with adequate clearance the tip 18 of each cutter tool or router 11 when the latter is in its lowered cutting position as shown in FIG. 3. The platens 15 can be made of any suitable sheet material which is sufficiently dimensionally stable and durable to withstand repeated and prolonged use. One material that has been found particularly suitable for the platens 15 is tempered hardboard. However, the platens could be formed of other sheet materials including but not limited to: various plastics, metals and ceramics.

In operation of the apparatus or machine 5, a stack of template or other workpiece blanks, indicated generally at 20, is placed on each of the platens 15. The stack 20 may be formed of any suitable number of individual blanks 21 composed of suitable sheet material. In the case of templates, the sheet material most commonly used is a transparent plastic. However, it will be understood that the blanks can be formed of other types of sheet material including composite materials. Each of the blanks will be pre-punched or drilled so as to have receiving holes 22—22 to fit over the locating pins 14 as shown in FIG. 3.

The open-ended space 23 (FIG. 3) provided between the underside of each platen 15 and the opposing top surface of the shiftable table 7 constitutes a plenum chamber or airflow channel through which a current or stream of air may be caused to flow as indicated by the arrows in FIG. 4. In apparatus 5, a manifold 24 is mounted on the shiftable table 7 with openings therein communicating with the adjacent ends respectively, of each plenum chamber 23. A flexible conduit 25 interconnects a nipple 26 on one end of the manifold 24 with the inlet connection (not shown) of a debris collecting and settling chamber 29.

A blower indicated diagrammatically at 27 is mounted on the tank or chamber 29 and equipped with an exhaust or discharge attachment 28 which may be provided with a replaceable filter screen 30. If desired, the air system 10 can be located in a room separate from the machine or apparatus 5.

As indicated in FIG. 4, by the arrows, the current or stream of air enters each plenum chamber or channel 23 from one end and exhausts from the other. The volume and velocity of the air flowing through each of the channels or plenum chambers 23 are selected so as to carry away the debris as it is formed by the operation of the routers or cutting tools 18. This debris will be made up of chips and other small particles as well as relatively large cutout pieces such as indicated at 31—31 in FIG. 4.

Preferably, the formation of the openings 17 in each stack of blanks 20 commences at the end thereof adjacent the end of the plenum chamber 23 where the air stream enters and progresses thereafter to the end where the air stream leaves, resulting in maximum suction in the openings as they are formed in each stack 20.

Preferably, each router tip or cutter bit 18 is provided with a source of compressed air so as to have one or more jets 32—32 discharge downwardly through the opening formed by the cutter bit or router tip 18. These downwardly directed air jets serve to assist the suction created in each opening formed in the stack 20 to positively remove and dislodge downwardly into the plenum chamber 23 all debris formed by each of the routers or rotary tools.

From the foregoing description, it is believed that the operation of the apparatus 5 will be readily apparent. At the start, the vertically-reciprocable tool carrier head 8 will be in its raised position and the table 7 will be positioned so the cutting tools 11 are over where the air enters the plenum chambers 23. A platen 15 having openings of the desired pattern will be mounted on each set or pair of support strips 12–13 and a stack of blanks 20 will be positioned on each platen 15. The air system 10 will be put in operation as will also the tools 11. The apparatus is now set to be operated in accordance with a numerically-controlled manner so as to form the openings of predetermined size, shape and location in each stack 20. It will be apparent that the head 8 will be repetitively lowered and raised to form each of the openings 17. Each time the head 8 is raised, the table 7 will suitably shift to position each stack 20 to a new location. Likewise, while the head 8 is in its lowered position, and depending on the relative sizes and shapes of the tool bit and an opening 17, the table 7 will be suitably shifted on the x and/or y axes so as to bring about the formation of each of the openings 17. With one primary exception, the foregoing operation of the apparatus 5 is known to those skilled in the art. The exception being that provision is made for the airflow through each of the plenums or channels 23 and creates a suction in each of the openings 17 as it is formed in each stack 20 thereby drawing down and removing debris as it is formed by each cutter or router tip 18 with the assistance of gravity and the air jets 32 if the latter are employed. Further, early removal of debris in the form of minute cuttings from cutter 18, enables each successive new cut to be made simply and cleanly. Thus, the quality of work performed is markedly improved, with a significant improvement in productivity rate as compared to the prior art. In this manner, the working surfaces of the apparatus 5 are maintained free and clear of debris. It has been found that by this particular manner of removal of debris, the apparatus 5 can operate faster and accommodate thicker stacks of blanks 20. Accordingly, the capacity and efficiency of the machine 5 are enhanced and increased.

A number of modifications may be made in the machine or apparatus 5. One modification is shown in FIG. 5 to which reference is now made. A cutter tool or router unit is indicated generally at 35 which may be of known type or correspond to the cutter tools or router unit 11 except that the air jets 32 and related supply lines are removed and replaced by a collar 36 from the underside of which extends a circular brush 37 which forms a chamber around each cutting or routing tip 38. The bottom ends of the bristles of the brush 37 bear down against the top surface of the uppermost blank in the stack 40 and thereby hold it down in place.

Preferably, de-ionized air is introduced into each unit 35 through a connection 41 which projects to one side. This de-ionized air flows downwardly around the cutting tip or router tip 38 and, in addition to assisting in the discharge of debris into the plenum chamber 23, the de-ionized air tends to remove static from the debris particles and thereby assists in the removal of the debris.

Certain other changes and modifications will be apparent from the foregoing description. For example, the tool carrier head 8 could be stationary and the table 7 supported in such manner that it is not only shiftable on the x and y axes but is also vertically reciprocable. Alternately, the table 7 could be stationarily mounted and the tool carrier head 8 could be not only vertically reciprocable but also shiftable on the x and y axes. Still another modification would be to have the table 7 vertically reciprocable while the tool carrier 8 is shiftable on the x and y axes.

By way of another change, the manifold could be located on one of the other three sides of the table 7 with the plenum chambers 23 extending at right angles thereto. The manifold 24 could also be replaced with separate exhaust conduits communicating between the outlet end of each channel 23 and the tank 29. Such separate or individual conduits could, for example, be flexible conduits such as conduit 25.

Instead of having only one tool for each station, as shown in FIG. 1, there can be two or more.

Certain other changes within the scope of the appended claims will be apparent to those skilled in the art without departing from the spirit and scope of the invention.

I claim:

1. In apparatus for making workpieces in the form of sheet material having openings therein of predetermined size, shape and position, said apparatus having a support platform mounted for shiftable movement in a horizontal plane on x and y axes, a tool-supporting head supporting at least one downwardly projecting rotary cutting tool said head being mounted for reciprocal vertical movement, and at least one platen for supporting a stack of one or more blanks of sheet material from which said workpieces are to be made, each said platen having openings therein sized, shaped and positioned to accommodate each said rotary cutting tool during movement in its lowered cutting position, the areas of said openings formed in said blanks by each said rotary cutting tool being appreciably larger than the cross-sectional area of each rotary cutting tool forming said respective openings, the improvement which comprises, means for supporting each said platen on and above said platform and providing an air flow channel therebetween which is open at opposite ends, and means for creating and maintaining a flow of air through said channel of such volume and velocity as to create downward suction in said openings as they are formed in said workpieces by said one or more rotary cutting tools, said suction and air flow being sufficient to remove from said workpieces, cutting tools and channels, debris as it is being produced by said one or more rotary cutting tools.

2. The apparatus of claim 1 wherein said workpieces are templates formed from template blanks.

3. The apparatus of claim 1 wherein air jet means is positioned adjacent at least one said downwardly projecting rotary cutting tool and discharges at least one air jet that assists in moving debris produced by said tool downwardly through openings formed thereby in said stack of workpiece blanks, and quickly away from the cutting edge of said cutting tools.

4. The apparatus of claim 1 wherein a brush surrounds a lower portion of at least one said downwardly projecting rotary tool with the ends of the brush bristles pressing down on the top of said stack of workpiece blanks, and an air connection provides for delivery of air under pressure into the interior of said brush so as to assist in moving debris produced by said tool downwardly through openings formed thereby in said stack of workpieces.

5. The apparatus of claim 4 including means for supplying de-ionized air to said air connection.

6. The apparatus of claim 1 wherein a plurality of said air flow channels have adjacent discharge openings and separate exhaust conduits, or an exhaust manifold is connected with said openings.

7. In the method of making workpieces in the form of pieces of sheet material having openings therein of predetermined size, shape and position and wherein said openings are formed by a vertically oriented rotary cutting tool through a stack of one or more workpiece blanks supported on a horizontal platform, said platform and cutting tool being relatively movable on the x, y and z axes, and the areas of said openings formed in said blanks by said tool being appreciably larger than the cross-sectional area of said tool, the steps of forming a horizontal air flow channel between the underside of said stack and the top of said platform and passing a current of air through said channel of sufficient volume and velocity to create suction in said openings and carry off debris as it is being produced in the cutting of said openings.

8. In the method of making templates having openings therein of predetermined size, shape and position as to conform to a predetermined pattern and wherein said openings are formed by a rotary cutting tool cutting said openings in a vertical direction through a stack of template blanks supported on a platen in spaced relationship over a horizontal platform shiftable on the x and y axes, the cutting tool being supported on a tool carrier vertically reciprocable on the z axis, and the areas of said openings formed in said blanks by said tool being appreciably larger than the cross-sectional area of said tool, the steps of forming a horizontal air flow channel from the space between said platen and platform, circulating air in a predetermined direction through said channel in a volume and velocity sufficient to create suction in said openings and carry off debris as it is being produced in the cutting of said openings, reciprocating said tool carrier on the z axis to bring said tool into cutting engagement with said stack and remove it therefrom after each said opening is formed, and shifting said platform on the x and y axes to form each opening of its proper size and shape.

9. The method of claim 8 wherein said openings are progressively formed in each stack in a direction corresponding to the direction of the air flow in said channel and commencing adjacent the entry of said air flow into said channel and terminating adjacent the exit of said air flow therefrom.

* * * * *